(12) United States Patent
Yokoyama

(10) Patent No.: US 6,279,825 B1
(45) Date of Patent: Aug. 28, 2001

(54) ELECTRONIC TRANSACTION TERMINAL FOR PREVENTING THEFT OF SENSITIVE INFORMATION

(75) Inventor: Yasuhiro Yokoyama, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/185,720

(22) Filed: Nov. 4, 1998

(30) Foreign Application Priority Data

Jun. 5, 1998 (JP) .................................................. 10-158060

(51) Int. Cl.[7] ....................................................... G06F 17/60
(52) U.S. Cl. .................................................. 235/379; 902/9
(58) Field of Search ............................... 735/379; 902/9, 902/38, 10, 8, 30; 280/440, 414.2

(56) References Cited

U.S. PATENT DOCUMENTS 5,726,430 * 3/1998 Ruggirello .......................... 235/379

FOREIGN PATENT DOCUMENTS 4-128948   4/1992  (JP) .

* cited by examiner

*Primary Examiner*—Karl D Frech
(74) *Attorney, Agent, or Firm*—Armstrong, Westerman, Hattori, McLeland & Naughton, LLP

(57) ABSTRACT

An electronic transaction terminal, in which a memory for information for storing therein an identification number inputted from a ten-key and a power unit for memory for supplying power to this memory for information are connected to each other with a film for printed pattern wiring (FPC). The FPC is placed throughout the internal surface of a security case. If someone tries to make a hole on the security case, any point of the wiring pattern of the FPC is cut off. For this reason, power supply to the memory for information is shut down and data on the memory for information is deleted.

10 Claims, 12 Drawing Sheets

ELECTRONIC TRANSACTION TERMINAL FOR PREVENTING THEFT OF SENSITIVE INFORMATION

FIELD OF THE INVENTION

The present invention relates to an electronic transaction terminal and more particularly, to an electronic transaction terminal which can effectively prevent theft personal identification numbers or the like.

BACKGROUND OF THE INVENTION

There has been a lot of talk about electronic money transactions using an IC card or the like, and there are actually some regions into which this system has been introduced. There has also been known an electronic transaction terminal called VST (Value Service Terminal) as a terminal used for electronic money transactions. This VST has functions such as depositing and withdrawing electronic money, checking a balance on a bank account, and checking transaction histories. The VST is connected to a host computer (HOST) provided in a bank or elsewhere through a communication line.

FIG. 15 is an explanatory view showing a sequence of communication between the VST and the HOST. A cipher for security is used for communications between a VST 500 and a HOST H. When the VST 500 transmits a communication-start signal to the HOST H, the HOST H encrypts an encrypting key "KEY2" using an encrypting key (KEY1), and transmits the encrypted key to the VST 500. The VST 500 decrypts the encrypted encrypting key "KEY2" with a decrypting key (KEY1') held by the VST 500 to acquire "KEY2".

Then, the VST 500 encrypts information for electronic transaction information "A" such as a personal identification number inputted by a user with the acquired encrypting key (KEY2), and transmits the encrypted information to the HOST H. The HOST H decrypts the encrypted electronic-transactional information "A" with a decrypting key (KEY2') to acquire the electronic-transactional information "A".

FIG. 16 is an explanatory view showing general configuration of the VST 500 and the HOST H. The decrypting key (KEY1') in the sequence is previously stored on a memory 501 of the VST 500. The memory 501 of the VST 500 temporarily stores thereon an encrypting key (KEY2) sent from the HOST H. The VST 500 has an input section 502 through which electronic-transactional information is inputted. While the HOST H has the encrypting key (KEY1), encrypting key (KEY2), and the decrypting key (KEY2') stored on a memory HM thereof. In addition, a program for the sequence is stored on each of the memories 501 and HM of the VST 500 and HOST H respectively, and CPUs 503 and HC are actuated according to the program. The VST 500 and the HOST H are connected to each other through interface circuits 504 and HI.

There has been known an information processing unit disclosed in Japanese Patent Laid-Open Publication No. HEI 4-128948 as a device for maintaining security of the information stored on a memory. This information processing unit is designed to cut off, when a cover for a main unit thereof is taken off, power to supply to a buttery-backup memory so that data on the memory is broken. Opening and closing of the cover is detected by a microswitch.

In the conventional type of VST 500, however, although the security of electronic-transactional information is ensured by encryption, the electronic-transactional information inputted from the input section 502 for the VST 500 exists as raw data on a circuit until the data is encrypted by the encrypting key (KEY2). For this reason, if the circuit with raw data existing thereon is tampered with to get unauthorized access thereto, electronic-transactional information may be stolen. In addition, if the decrypting key (KEY1') stored on the memory 501 of the VST 500 is illegally read, the contents of the encrypting key (KEY2) sent from the HOST H may leak, which may cause electronic-transactional information to be stolen.

In the information processing unit, the microswitch is set as a trigger, so that data on the memory is broken as soon as the case for the main unit is opened. And for this reason, if the case is not opened but the unit is tampered with by making a hole on the case thereof with a drill or so to get unauthorized access to the circuit, the security is not sufficiently ensured any more. Also, data would be deleted by opening the case for the main unit, so that it is required to set data again even when maintenance is executed to any section nothing to do with the security, which makes the work more troublesome.

SUMMARY OF THE INVENTION

It is an object of the present invention to provide, for solving the problems described above, an electronic transaction terminal from which electronic-transactional information is hardly stolen and in which easy maintenance can be given to any section nothing to do with security.

With the present invention, electronic components not requiring security can easily be maintained by accommodating an electronic component requiring the security in a security case. Namely, even if the case for the main unit is opened, the functions of the terminal will not be terminated on condition that no change is given to the security case, so that there is no need to carry out a work such as setting data again. In addition, wiring is run throughout the internal side of the security case, so that the wiring is cut off if, for example, the security case is opened. For this reason, even if someone tries to steel information inside the case, such action is taken that the functions of the terminal are terminated by cutting off the wiring, for example, that programs and data stored on the memory are deleted so that the terminal does not run any more, and for this reason, information on electronic transactions inside a security case can be protected from theft.

With the present invention, electronic components not requiring security can also easily be maintained by accommodating an electronic component requiring the security in a security case. In addition, if redundant wiring is provided inside the security case, and if, for example, someone makes a hole on the security case, a tool or so may contact any point of the wiring during the mischievous operation, which makes the wiring cut off. Any information on electronic transactions inside a security case can be protected from theft on condition that functions of the terminal are terminated in response to cutting off of this wiring.

With the present invention, when a user inputs an identification number through a control section, for example, this identification number is stored once on a memory of the terminal. The identification number stored on the memory may easily be stolen. For this reason, the information for electronic transactions stored on the memory is programmed to be deleted if the wiring placed throughout the internal surface of the security case is cut off with some cause from outside. With this programming, a third person hardly steels an identification number, which allows the safety to be enhanced. In addition, electronic components not requiring security can easily be maintained by accommodating an electronic component requiring the security in a security case.

With the present invention, information for electronic transactions stored on the memory is programmed to be deleted if redundant wiring inside the security case is cut off by manipulating some change thereto from outside. For this reason, a third person hardly steels an identification number, which allows the safety to be enhanced. In addition, electronic components not requiring security can easily be maintained by accommodating an electronic component requiring the security in a security case.

With the present invention, if contents of the memory is programmed to be deleted by detecting disintegration or breakage of the security case, the safety is further enhanced. For example, the security case has a divided structure and microswitches are located in divided sections respectively, so that disintegration of the security case can be detected. Data on the memory may be deleted in response to detection of this disintegration.

With the present invention, information for an electronic transaction requiring security is, in many cases, inputted through a control section. The information indicates, for example, a user's identification number. Therefore, the control section is accommodated in a security case. For this reason, theft of data from the control section can be prevented.

With the present invention, when a security case is assembled by finally screwing screws therein, it is conceivable that the electronic transaction terminal is tampered with to get unauthorized access thereto from screw holes by screwing out the screws therefrom. On the other hand, wiring can not be provided on the screw holes because the wiring is prevented from cutting off due to the screws. Therefore, each of the switches is set as a trigger for each of the screws so that information for electronic transactions stored on the memory is deleted in response to turning ON/OFF of the switches. With this programming, theft of information from the screw sections can be prevented, which allows the safety to be enhanced.

Other objects and features of this invention will become understood from the following description with reference to the accompanying drawings.

BRIEF DESCRIPTION OF THE DRAWINGS

FIG. 3 is an exploded view of the security case shown in

DESCRIPTION OF THE PREFERRED EMBODIMENT

Detailed description is made hereinafter for an electronic transaction terminal according to the present invention with reference to the related drawings. It should be noted that the present invention is not limited by this embodiment.

Figure 1:
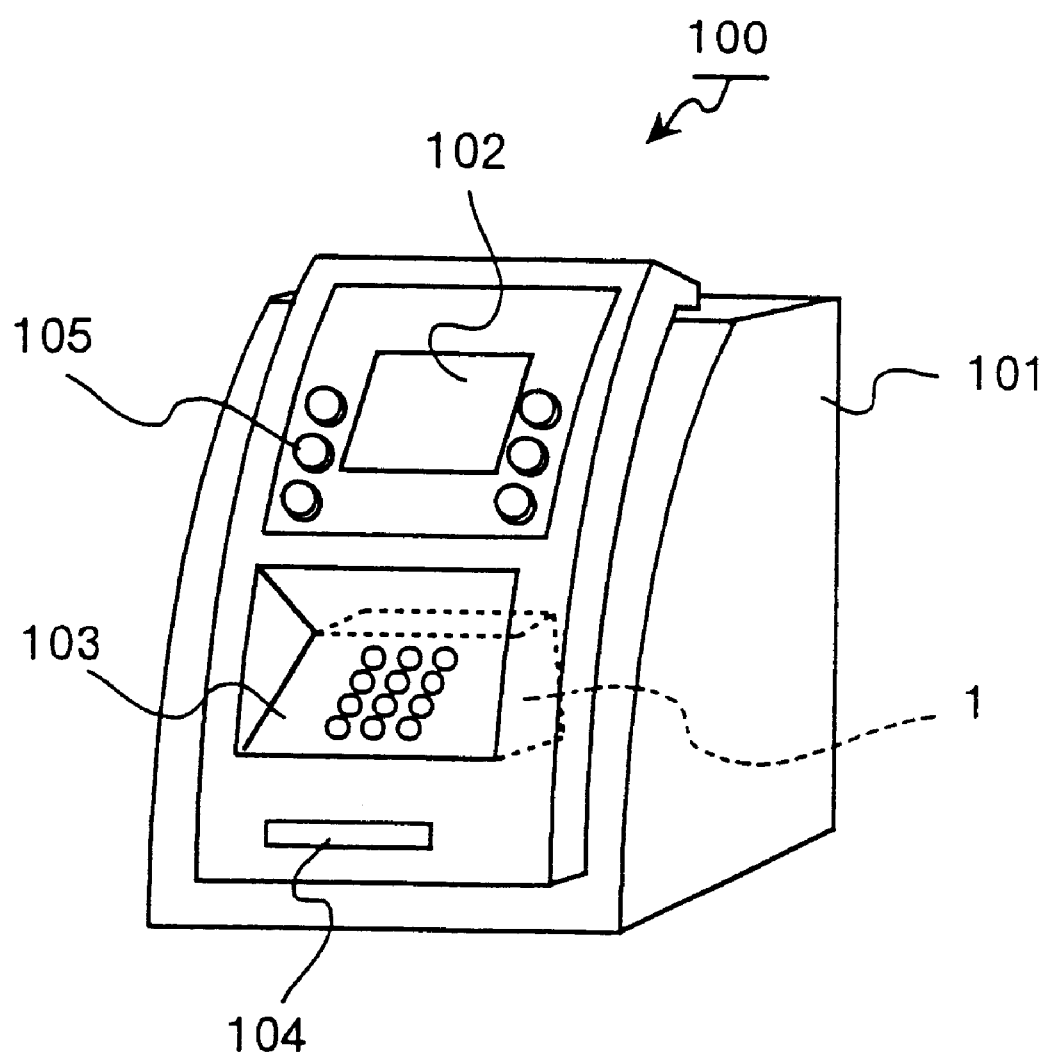
FIG. 1 is a perspective view showing an electronic transaction terminal (VST) according to Embodiment of the present invention.

FIG. 1 is a perspective view showing an electronic transaction terminal (VST) according to Embodiment of the present invention. A VST 100 has an LCD 102 for displaying information on the front face of a case for a main unit, a ten-key 103, and a slot 104 for an IC card. Provided around the LCD 102 are various types of function key 105. The VST 100 is also connected to the HOST through an RS232C cable. A security case 1 is accommodated inside the case 101 for the main unit.

Figure 2:
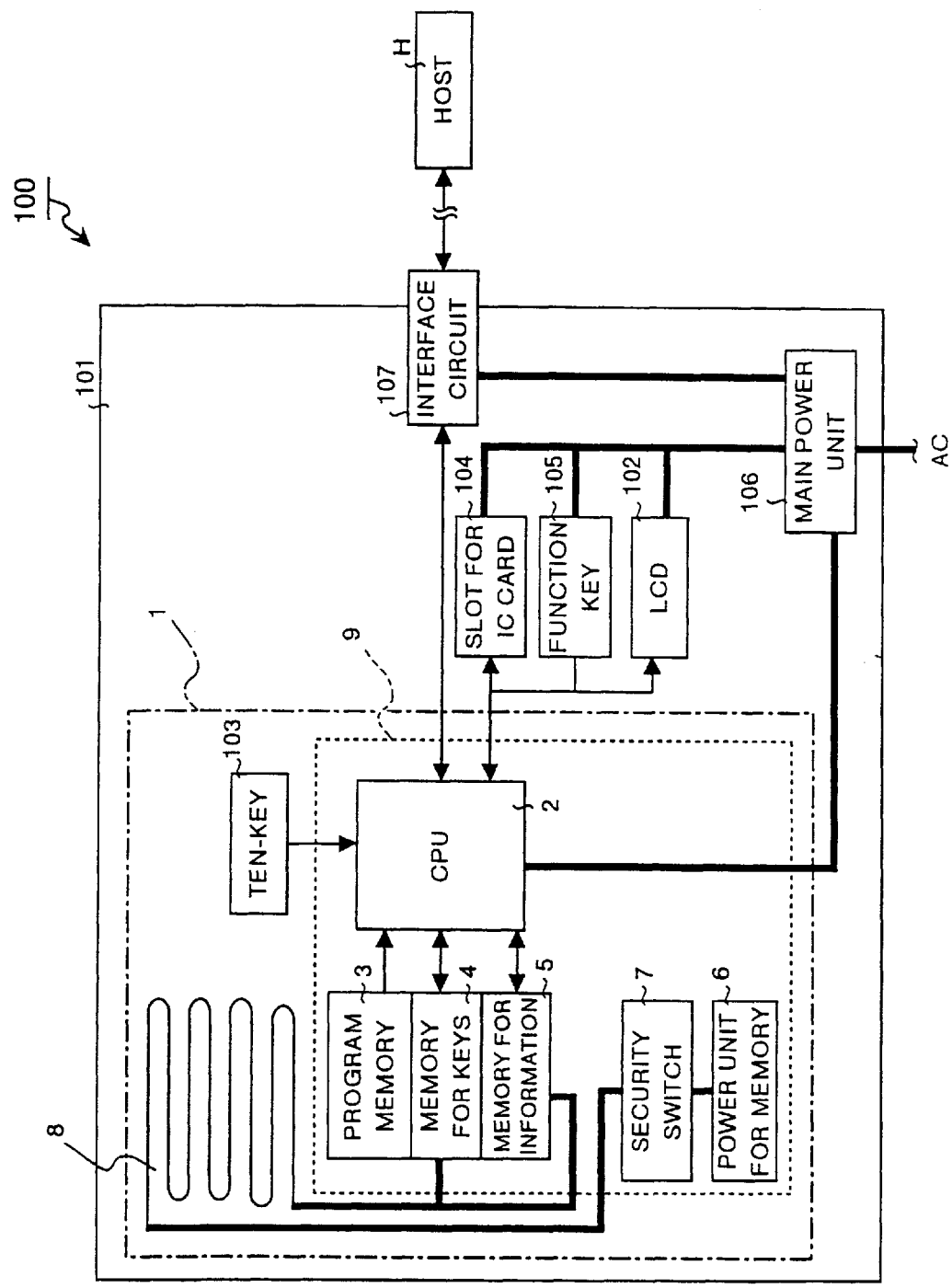
FIG. 2 is a block diagram of the VST shown in FIG. 1.

FIG. 2 is a block diagram of the VST shown in FIG. 1. Accommodated in the security case 1 are the ten-key 103 with a key section exposed to the outside of the case 101 for the main unit, a CPU 2 for executing information processing, a program memory 3 for storing thereon a program or the like for communications with the HOST H, a memory 4 for keys for previously registering thereon decrypting keys (KEY1') and also temporarily storing thereon an encrypting key sent from the HOST H, a memory 5 for information for temporarily storing thereon electronic-transactional information such as a personal identification number and some other data and also storing thereon electronic-transactional information sent from the HOST H, a power unit 6 for memory for supplying power to the memory 4 for keys as well as to the memory 5 for information, a security switch 7 for shutting down a power supply from the power unit 6 for memory to the memory 4 for keys as well as to the memory 5 for information, and a film 8 for printed-pattern wiring (FPC) for supplying power from the power unit 6 for memory to the memory 4 for keys as well as to the memory 5 for information.

Mounted on an IC board 9 are the CPU 2, a group of memories 3 to 5, power unit for memory 6, and the security switch 7. A main power unit 106 for the terminal, an interface circuit 107 with the HOST H, the IC card slot 104, the LCD 102, and the function keys 105 are accommodated inside the case 101 for the main unit but outside the security case 1. The main power unit 106 does not supply power to the memory 4 for keys as well as to the memory 5 for information.

Figure 3:
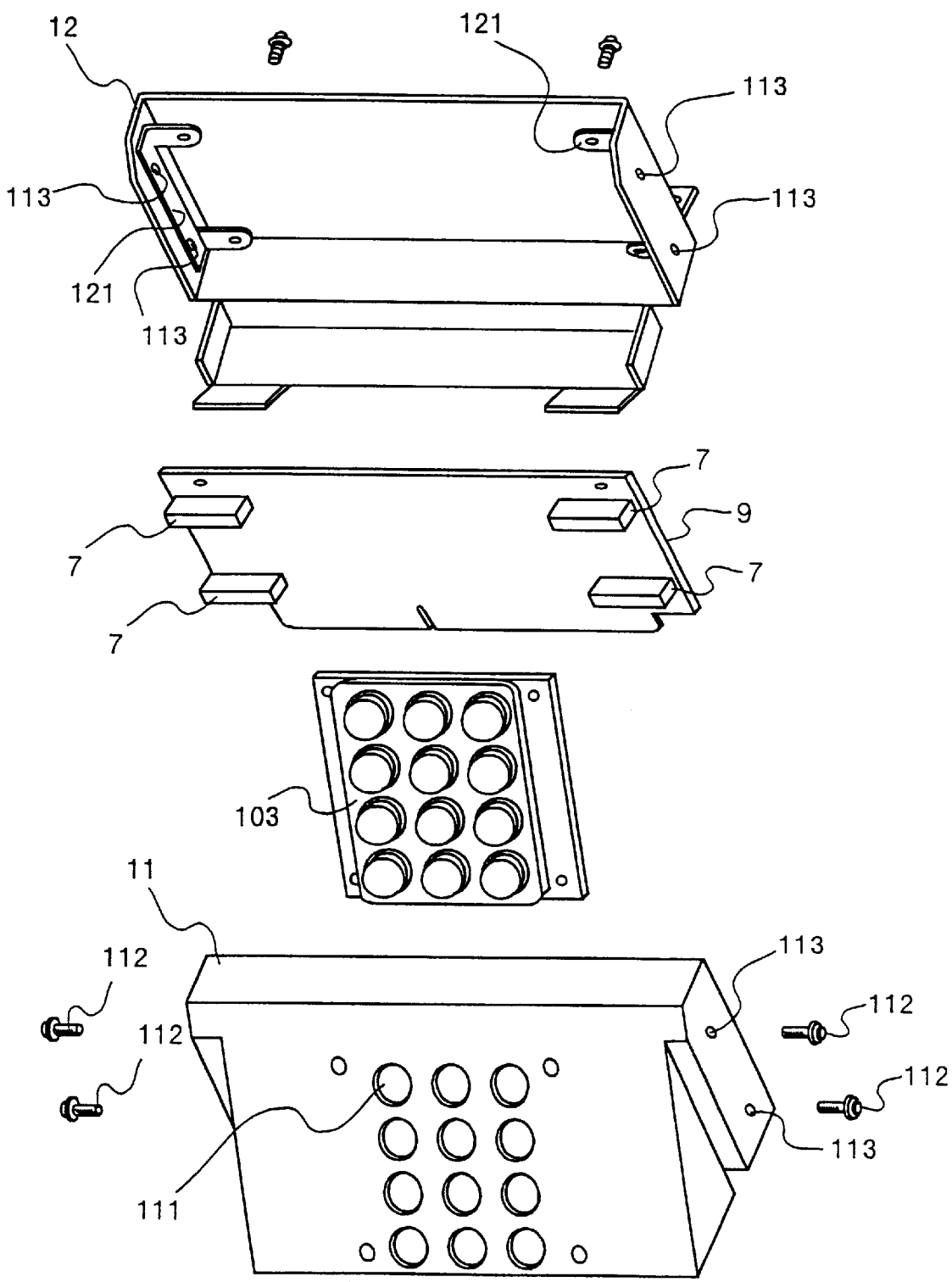

FIG. 3 is an exploded view of the security case shown in FIG. 1. This security case 1 has a divided structure made of a sheet metal and consists of a front case 11 and a rear case 13. A hole 111 is made on the front case 11 so that the key section of the ten-key 103 is exposed to the outside. Welded on the rear case 12 are mounting brackets 121 for mounting thereon the IC board 9. The security switches 7 are mounted on four corners of the IC board 9. It should be noted that other electronic components are not shown in the figure. A microswitch is used for the security switch 7. In order to assemble the security case 1, at first, the FPC 8 is placed throughout the internal surface of the front case 11 as well as of the rear case 12. Then, required wiring is provided, and the IC board 9 and the ten-key 103 are mounted thereon. After the mounting, the front case 11 and the rear case 12 are fixed to each other with screws 112, the security switches 7 are brought to conduction with the screws 112. The reference numeral 113 indicates holes for the screws.

Next description is made for placement of the FPC 8 and the security switch 7.

Figure 4:
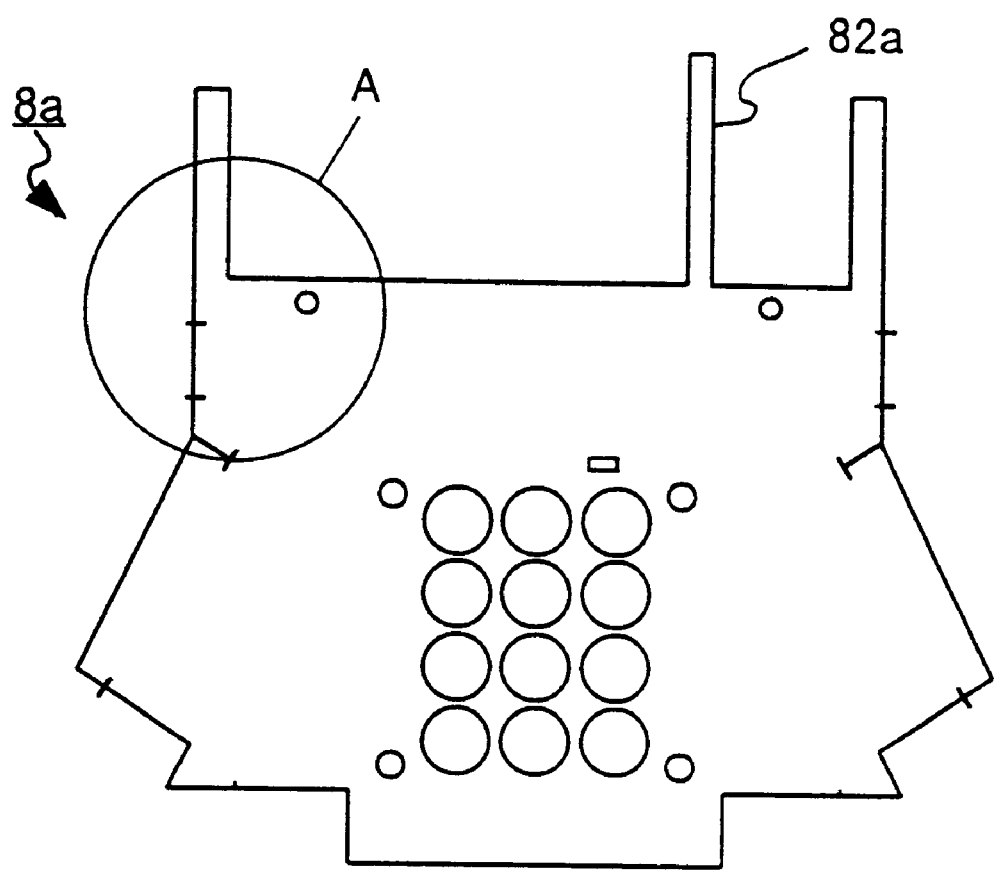
FIG. 4 is a developed view of a FPC placed throughout the internal surface of a front case.
Figure 5:
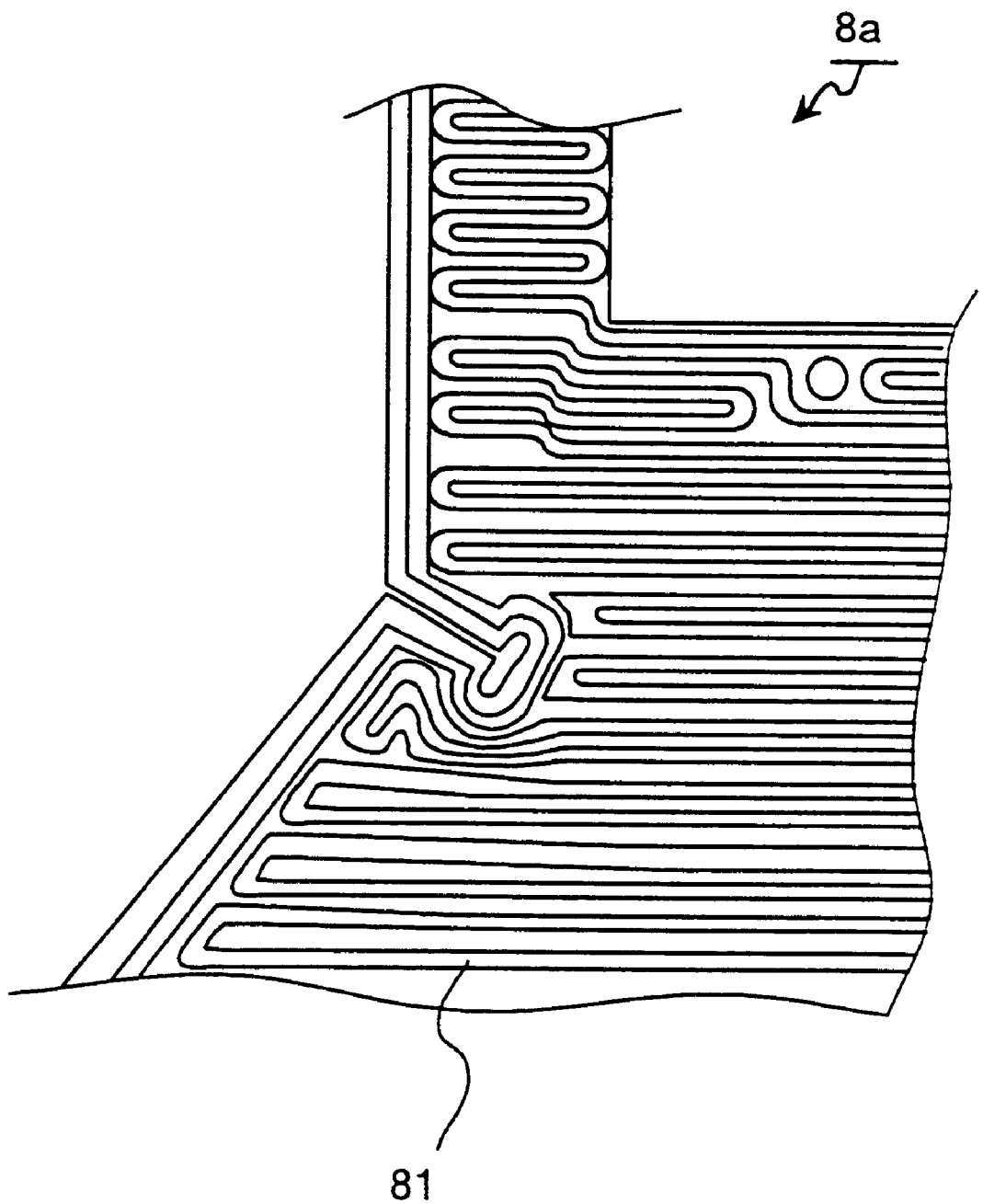
FIG. 5 is an enlarged view of the section A in FIG. 4.
Figure 6:
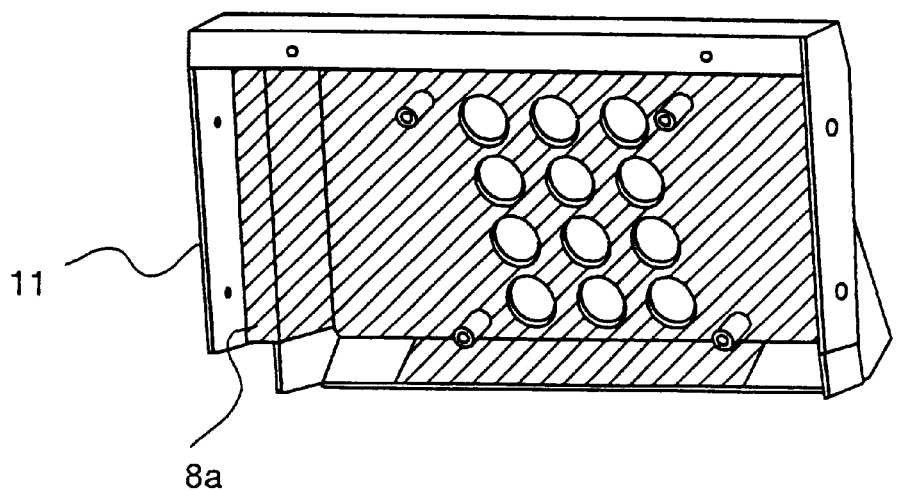
FIG. 6 is an explanatory view showing a state of the FPC placed throughout the internal surface of the front case.

FIG. 4 is a developed view of the FPC placed throughout the internal surface of the front case. FIG. 5 is an enlarged view of the section A in FIG. 4. FIG. 6 is an explanatory view showing a state of the FPC placed throughout the internal surface of the front case. A line of long wiring is formed in a fine pattern on a FPC 8a (wiring pattern 81). The FPC 8a described above is, at first, formed on the developed form of the front case. The form of the FPC 8a can easily be made from the drawing on the sheet metal for the front case 11. Then, the FPC 8a is bent to match the form of the front case 11. An adhesive is used for placement of the FPC 8a. Both ends of the wiring pattern 81 are leads 82a connected to the FPCs 8 on other sections.

Figure 7:
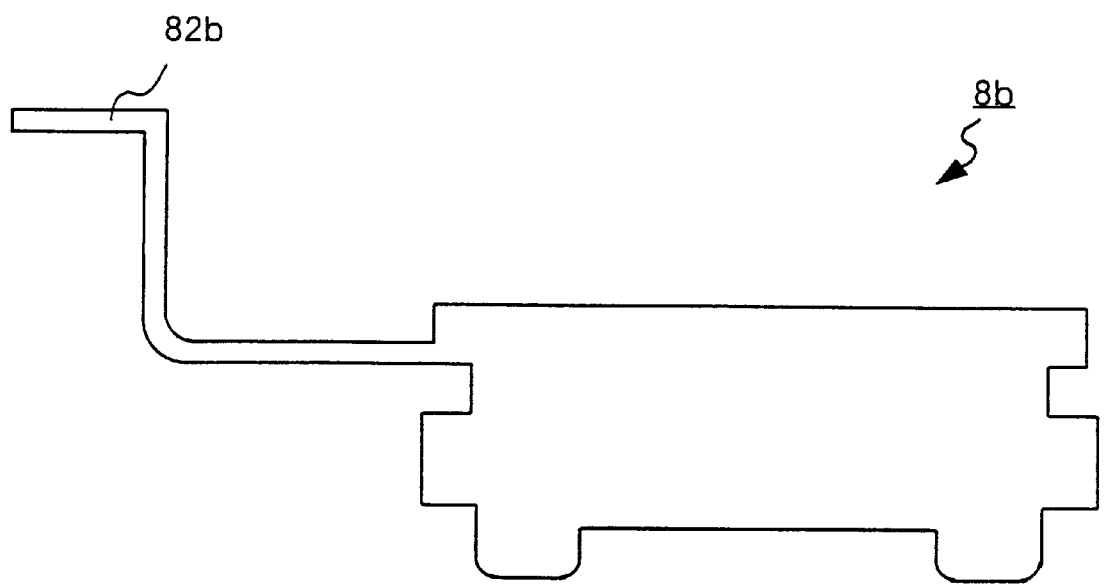
FIG. 7 is a developed view of the FPC placed throughout the bottom face of a rear case.
Figure 8:
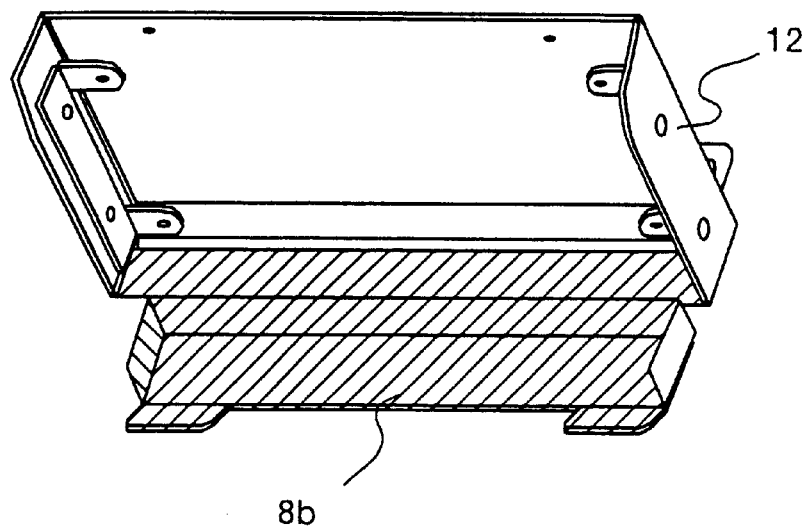
FIG. 8 is an explanatory view showing a state of the FPC placed throughout the bottom face of the rear case.

FIG. 7 is a developed view of the FPC placed throughout the bottom face of the rear case. FIG. 8 is an explanatory view showing a state of the FPC placed throughout the bottom face of the rear case. Although the structure of a FPC 8b is the same as that described above, an a wiring pattern 81 is different depending on a form of the FPC 8, and even though, a line of long wiring remains the same. The form of this FPC 8b is substantially the same as that of the bottom face of the rear case 12. At first, the FPC 8b is made to the form as described above and bent to match the form of the rear case 12. An adhesive is used for placement of the FPC 8b. Both ends of the wiring pattern 81 are leads 82b connected to the FPCs 8 on other sections.

Figure 9:
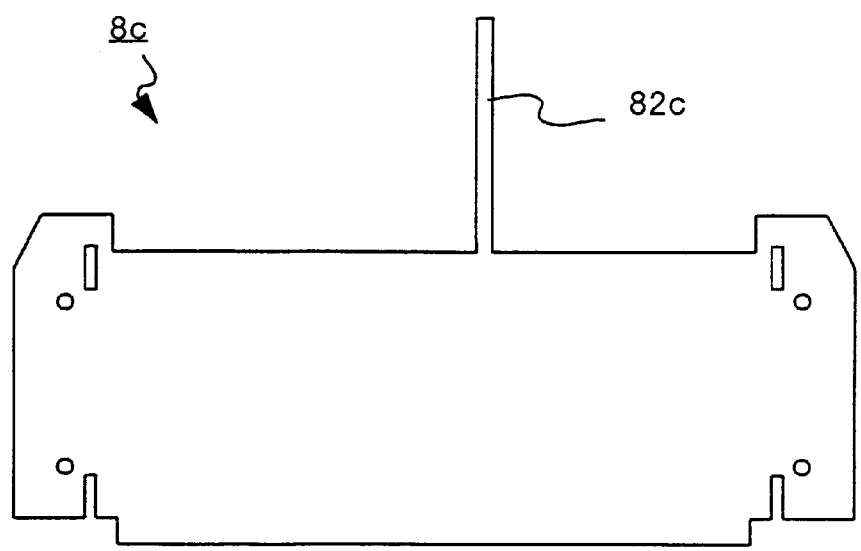
FIG. 9 is a developed view of the FPC placed throughout the internal surface of the rear case.
Figure 10:
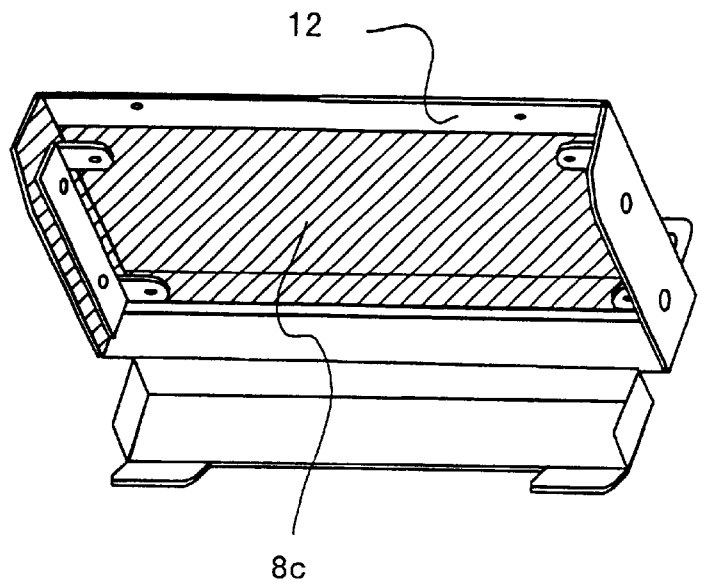
FIG. 10 is an explanatory view showing a state of the FPC placed throughout the bottom face of the rear case.

FIG. 9 is a developed view of the FPC placed throughout the internal surface of the rear case. FIG. 10 is an explanatory view showing a state of the FPC placed throughout the bottom face of the rear case. The structure of a FPC 8c is the same as that described above. The form of this FPC 8c is substantially the same as that of the internal surface of the rear case 12. At first, the FPC 8c is made to the form as described above and bent to match the form of the rear case 12. An adhesive is used for placement of the FPC 8c. It should be noted that the FPC is not stuck to the screw holes 113 for fixing the front case 11 to the rear case 12. This is because the wiring pattern 81 of the FPC 8 is cut off by the screws 112. Both ends of the wiring pattern 81 are leads 82c connected to the FPCs 8 on other sections.

Figure 11:
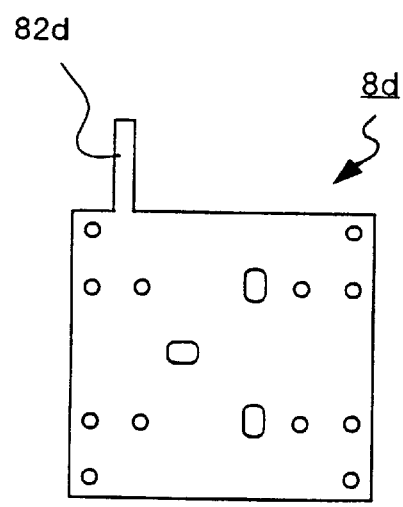
FIG. 11 is a developed view of the FPC provided between a sheet metal of a ten-key and a membrane sheet.
Figure 12:
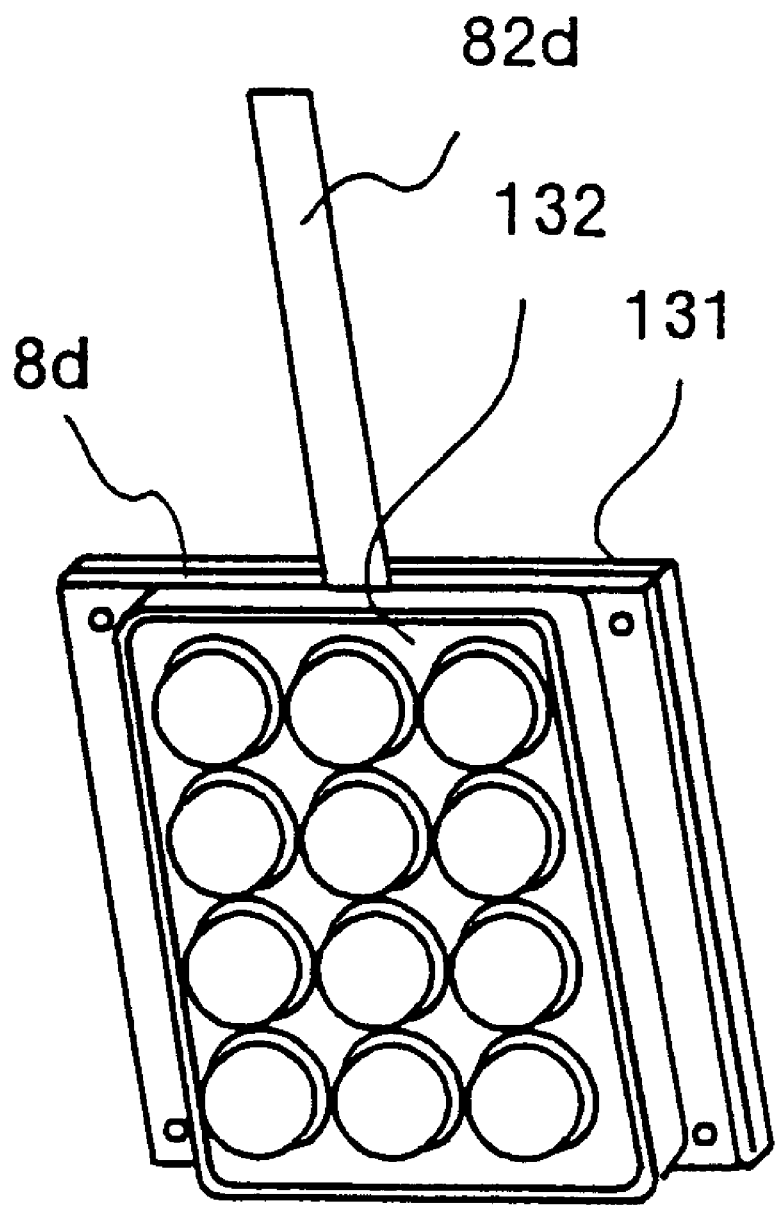
FIG. 12 is an explanatory view showing a state of the FPC placed throughout the ten-key.

FIG. 11 is a developed view of the FPC provided between a sheet metal of a ten-key and a membrane sheet. FIG. 12 is an explanatory view showing a state of the FPC placed throughout the ten-key. A FPC 8d is also provided between the sheet metal 131 of the ten-key 103 and the membrane sheet 132. Both ends of the wiring pattern 81 are leads 82d connected to the FPCs 8 on other sections.

Figure 13:
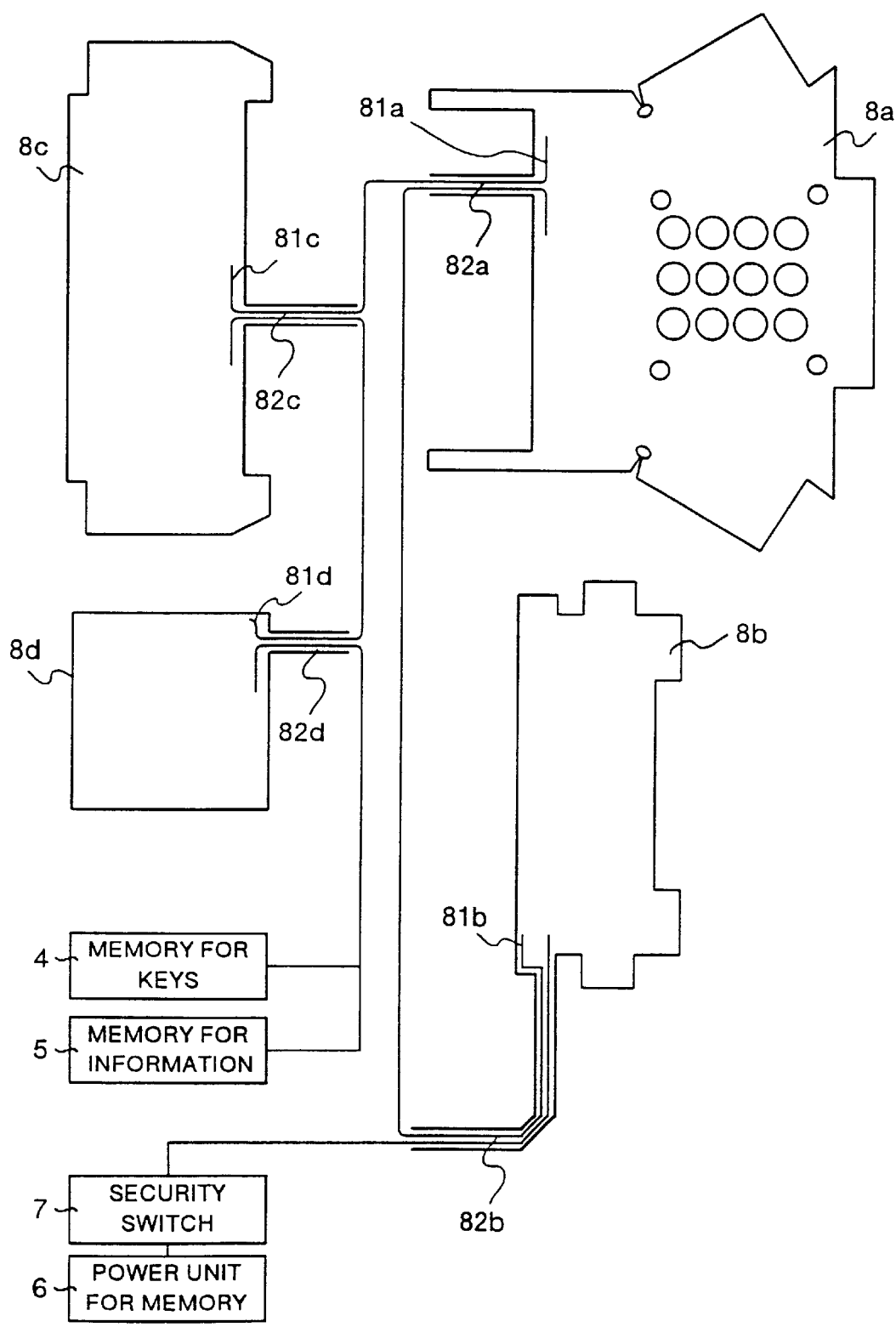
FIG. 13 is an explanatory view showing a connected state of wiring patterns.

FIG. 13 is an explanatory view showing a connected state of the wiring patterns 81. As described above, the wiring coming out from the power unit 6 for memory passes through the security switches 7, and is connected to the memory 5 for information as well as to the memory 4 for keys for each terminal by connecting among the leads 82a to 82d of the FPCs 8a to 8d respectively. For this reason, even if any section of the wiring patterns 81 is cut off, power supply is shut down to the memory 5 for information as well as to the memory 4 for keys.

Figure 14:
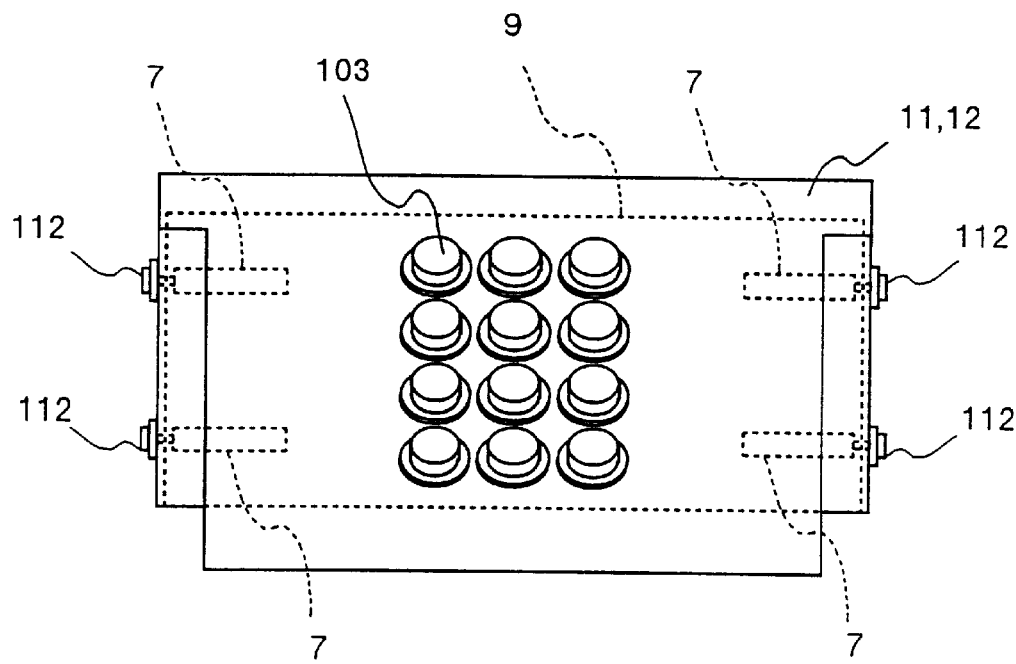
FIG. 14 is an explanatory view showing a positional relation between a security switch and a screw when the security case is assembled.

FIG. 14 is an explanatory view showing a positional relation between the security switches 7 and the screws 112 when the security case is assembled. The front case 11 and the rear case 12 are fixed to each other with four screws 112. Each tip of the screws 112 contact each of the security switches 7 provided on the IC board 9 in a state of the screws 112 screwed in the screw holes 113. In this state, power can be supplied from the power unit 6 for memory to the memory 5 for information as well as to the memory 4 for keys. When the screws 112 are screwed out therefrom, the security switches 7 are cut off, so that the power supply to the memory 5 for information as well as to the memory 4 for keys is shut down. Those security switches 7 are connected in serial (not shown). For this reason, even if any one of the security switches is cut off, the power supply to the memory 5 for information as well as to the memory 4 for keys is shut down.

Figure 15:
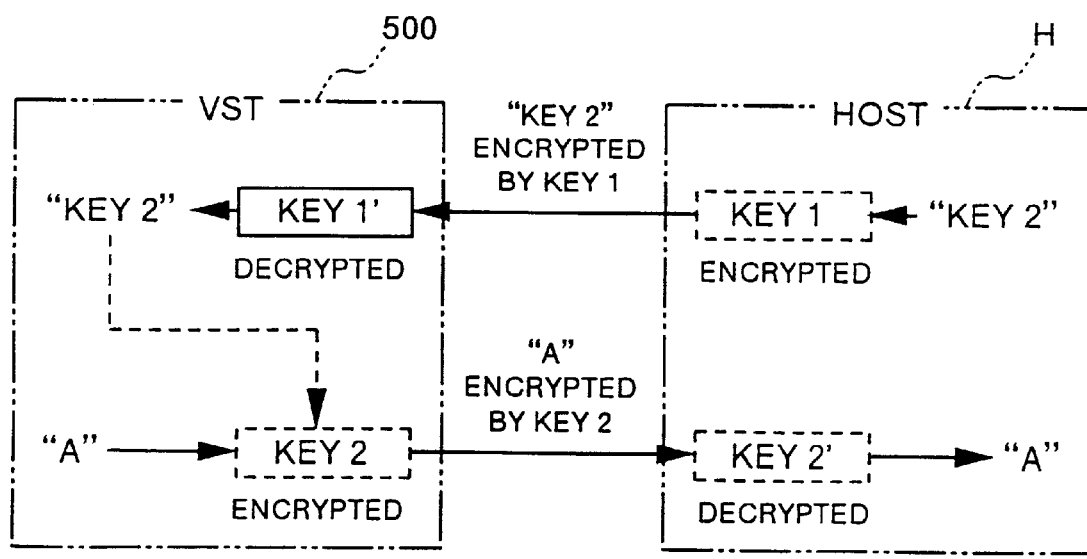
FIG. 15 is an explanatory view showing a sequence of communications between the VST and the HOST.
Figure 16:
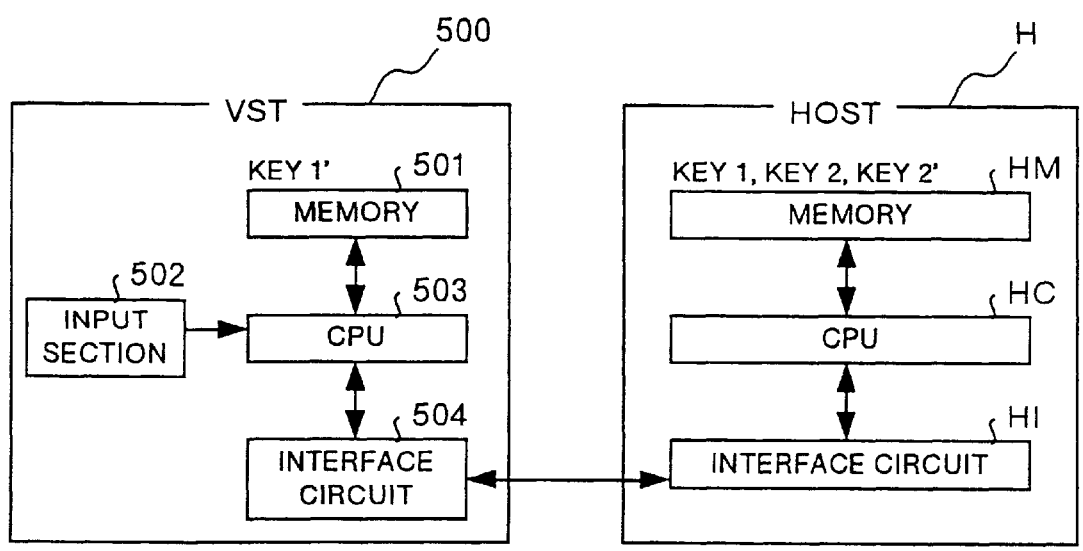
FIG. 16 is an explanatory view showing general configuration of the VST and the HOST.

Next description is made for the operation of this VST 100. Consideration is made here to a case when unauthorized access is made to a use's identification number stored on the memory 5 for information, for example, by making a hole with a drill on the security case 1. Any point of the wiring pattern 81 placed throughout the internal side of the security case 1 may be cut off by making a hole with a drill on the security case 1. With this feature, power supply from the power unit 6 for memory to the memory 5 for information is shut down, and data stored on the memory 5 for information is deleted. Similarly, the decrypting key (KEY1') stored on the memory 4 for keys is also deleted. When the decrypting key (KEY1') is lost, the encrypting key (KEY2) sent from the HOST H can not be decrypted (Refer to FIG. 15), and then, the functions of the terminal are terminated.

Further, even if a hole is made with a drill on the ten-key 103, the FPC 8d is provided between the membrane sheet 132 and the sheet metal 131, so that the wiring pattern 81 is cut off. For this reason, the data on the memory 5 for information is deleted, and then, the functions of the terminal are terminated.

Next consideration is made to a case when data is stolen by opening the security case 1. It is necessary to screw out the fixed screws 112 in order to open the security case 1. However, each tip of the screws contacts each of the security switches 7, so that the security switches 7 are cut off by screwing out the screws 112. With this feature, power supply from the power unit 6 for memory to the memory 5 for information is shut down, and then the data stored on the memory 5 for information is deleted. Similarly, the decrypting key (KEY1') stored on the memory 4 for keys is also deleted. Data is deleted even if any of the four screws is screwed out. It should be noted that only data on the memory 5 for information may be programmed to be deleted.

As described above, with this VST 100, data stored on the memory 5 for information as well as on the memory 4 for keys is deleted as soon as someone tries to steel electronic-transactional information by tampering with the security case 1, so that electronic-transactional information can be prevented from theft. In addition, data is not deleted when only the case 101 for the main unit is opened, so that a maintenance work or the like can easily be carried out.

It should be noted that data may be deleted by fixing not the FPC 8 but an ordinary nichrome wire to the internal section of the security case 1 according to cutting off the the nichrome wire. In addition, a wiring pattern may be printed on a metal board having substantially the same form of that of the security case to fix the pattern to the internal side of the case. Also, the security switch 7 may be constructed with the screw 112 itself to be a conductor so that the switch is cut off by screwing out the screw 112.

As described above, with the present invention, an electronic component requiring the security is accommodated in a security case inside a case for a main unit, wiring is run throughout the internal surface of this security case, and functions of the terminal are terminated in response to cutting off of this wiring. For this reason, electronic components not requiring security can easily be maintained. In addition, information on electronic transactions inside a security case can be protected from theft.

With the present invention, an electronic component requiring the security is accommodated in a security case inside a case for a main unit, redundant wiring is provided inside this security case, and functions of the terminal are terminated in response to cutting off of this wiring. For this reason, electronic components not requiring security can easily be maintained. In addition, information on electronic transactions inside a security case can be protected from theft.

With the present invention, a memory is accommodated in a security case inside a case for a main unit, wiring is run throughout the internal surface of the security case, and information for electronic transactions stored on the memory is deleted in response to cutting off of this wiring. For this reason, a third person hardly steels an identification number, which allows the safety to be enhanced. In addition, electronic components not requiring security can easily be maintained.

With the present invention, a memory is accommodated in a security case inside a case for a main unit, redundant wiring is provided inside the security case, and information for electronic transactions stored on the memory is deleted in response to cutting off of this wiring. For this reason, a third person hardly steels an identification number, which allows the safety to be enhanced. In addition, electronic components not requiring security can easily be maintained.

With the present invention, information for electronic transactions stored on the memory is deleted by detecting disintegration or breakage of the security case, so that the safety is further enhanced.

With the present invention, the control section is accommodated in a security case with a key section exposed to outside, so that theft of raw data from the control section can be prevented.

With the present invention, switches with screws as elements used for assembling a case for the main unit are provided in the security case, and information for electronic transactions stored on the memory is deleted in response to turning ON/OFF of the switches. For this reason, theft of information from the screw sections can be prevented, which allows the safety to be enhanced.

This application is based on Japanese patent application No. HEI 10-158060 filed in the Japanese Patent Office on Jun. 5, 1998, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An electronic transaction terminal for inputting therein information for an electronic transaction such as a personal identification number and some other data through a control section and carrying out communications for the electronic-transactional information with a host computer through a communication means; wherein an electronic component requiring security is accommodated in a security case inside a case, of a main unit thereof, wiring is run throughout an entire internal surface of this security case, and functions of the terminal are terminated in response to cutting off of this wiring.

2. An electronic transaction terminal for inputting therein information for an electronic transaction such as a personal identification number and some other data through a control section and carrying out communications for the electronic-transactional information with a host computer through a communication means; wherein an electronic computer requiring security is accommodated in a security case inside a case for a main unit thereof, redundant wiring is provided throughout the entire internal surface of this security case, and functions of the terminal are terminated in response to cutting off of this wiring.

3. An electronic transaction terminal for inputting therein information for an electronic transaction such as a personal identification number and some other data through a control section, storing this inputted electronic-transactional information on a memory, and carrying out communications for the electronic-transactional information with a host computer through a communication means; wherein the memory is accommodated in a security case inside a case for a main unit thereof, wiring is run throughout an entire internal surface of the security case, and the electronic-transactional information stored on the memory is deleted in response to cutting off of this wiring.

4. An electronic transaction terminal according to claim 3; wherein the electronic-transactional information stored on said memory is deleted further by detecting disintegration or breakage of said security case.

5. An electronic transaction terminal according to claim 3; wherein said control section is accommodated in the security case with a key section thereof exposed to the outside.

6. An electronic transaction terminal according to claim 3; wherein switches with screws as elements used for assembling said case for the main unit are further provided in said security case, and the electronic-transactional information stored on the memory is deleted in response to turning ON/OFF of the switches.

7. An electronic transaction terminal for inputting therein information for an electronic transaction such as a personal identification number and some other data through a control section, storing this inputted electronic-transactional information on a memory, and carrying out communications for the electronic-transactional information with a host computer through a communication means; wherein the memory is accommodated in a security case inside a case for a main unit thereof, redundant wiling is provided throughout the entire internal surface of the security case, and the electronic-transactional information stored on the memory is deleted in response to cutting off of this wiring.

8. An electronic transaction terminal according to claim 7; wherein the electronic-transactional information stored on said memory is deleted further by detecting disintegration or breakage of said security case.

9. An electronic transaction terminal according to claim 7; wherein said control section is accommodated in the security case with a key section thereof exposed to the outside.

10. An electronic transaction terminal according to claim 7; wherein switches with screws as elements used for assembling said case for the main unit are further provided in said security case, and the electronic-transactional information stored on the memory is deleted in response to turning ON/OFF of the switches.

* * * * *